United States Patent
Smith et al.

(10) Patent No.: US 7,124,149 B2
(45) Date of Patent: Oct. 17, 2006

(54) METHOD AND APPARATUS FOR CONTENT REPRESENTATION AND RETRIEVAL IN CONCEPT MODEL SPACE

(75) Inventors: John R. Smith, New Hyde Park, NY (US); Milind Naphade, Urbana, IL (US); Apostol Natsev, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 10/319,295

(22) Filed: Dec. 13, 2002

(65) Prior Publication Data

US 2004/0117367 A1    Jun. 17, 2004

(51) Int. Cl.
G06F 17/30    (2006.01)

(52) U.S. Cl. .................. 707/104.1; 707/1; 707/102; 382/224

(58) Field of Classification Search ................ 707/1–7, 707/100–102, 104.1; 706/59, 45; 704/7; 382/224–225
See application file for complete search history.

(56) References Cited

U.S. PATENT DOCUMENTS

| | | | | |
|---|---|---|---|---|
| 5,794,178 A | * | 8/1998 | Caid et al. .................. 704/9 |
| 6,101,515 A | * | 8/2000 | Wical et al. ............... 715/531 |
| 6,334,129 B1 | * | 12/2001 | Kiyoki et al. .................. 707/5 |
| 6,405,166 B1 | * | 6/2002 | Huang et al. ............... 704/246 |
| 6,598,054 B1 | * | 7/2003 | Schuetze et al. ........ 707/103 R |
| 6,714,909 B1 | * | 3/2004 | Gibbon et al. ............. 704/246 |
| 6,819,797 B1 | * | 11/2004 | Smith et al. ................ 382/181 |
| 6,915,009 B1 | * | 7/2005 | Foote et al. ................ 382/173 |
| 6,922,699 B1 | * | 7/2005 | Schuetze et al. ........ 707/103 R |
| 7,020,194 B1 | * | 3/2006 | Sim et al. .............. 375/240.03 |
| 7,024,033 B1 | * | 4/2006 | Li et al. ..................... 382/159 |
| 7,050,607 B1 | * | 5/2006 | Li et al. ..................... 382/118 |
| 2002/0078043 A1 | * | 6/2002 | Pass et al. ..................... 707/6 |
| 2002/0105541 A1 | * | 8/2002 | Endou et al. ............... 345/738 |
| 2002/0107827 A1 | * | 8/2002 | Benitez-Jimenez et al. ... 706/59 |
| 2003/0103675 A1 | * | 6/2003 | Endo et al. ................. 382/229 |

FOREIGN PATENT DOCUMENTS

EP    1094408 A2 *    4/2001

* cited by examiner

*Primary Examiner*—Debbie M. Le
(74) *Attorney, Agent, or Firm*—Anne Vachon Dougherty

(57) ABSTRACT

A method and apparatus for extracting a model vector representation from multimedia documents. A model vector provides a multidimensional representation of the confidence with which multimedia documents belong to a set of categories or with which a set of semantic concepts relate to the documents. A model vector can be associated with multimedia documents to provide an index of its content or categorization and can be used for comparing, searching, classifying, or clustering multimedia documents. A model vector can be used for purposes of information discovery, personalizing multimedia content, and querying a multimedia information repository.

28 Claims, 7 Drawing Sheets

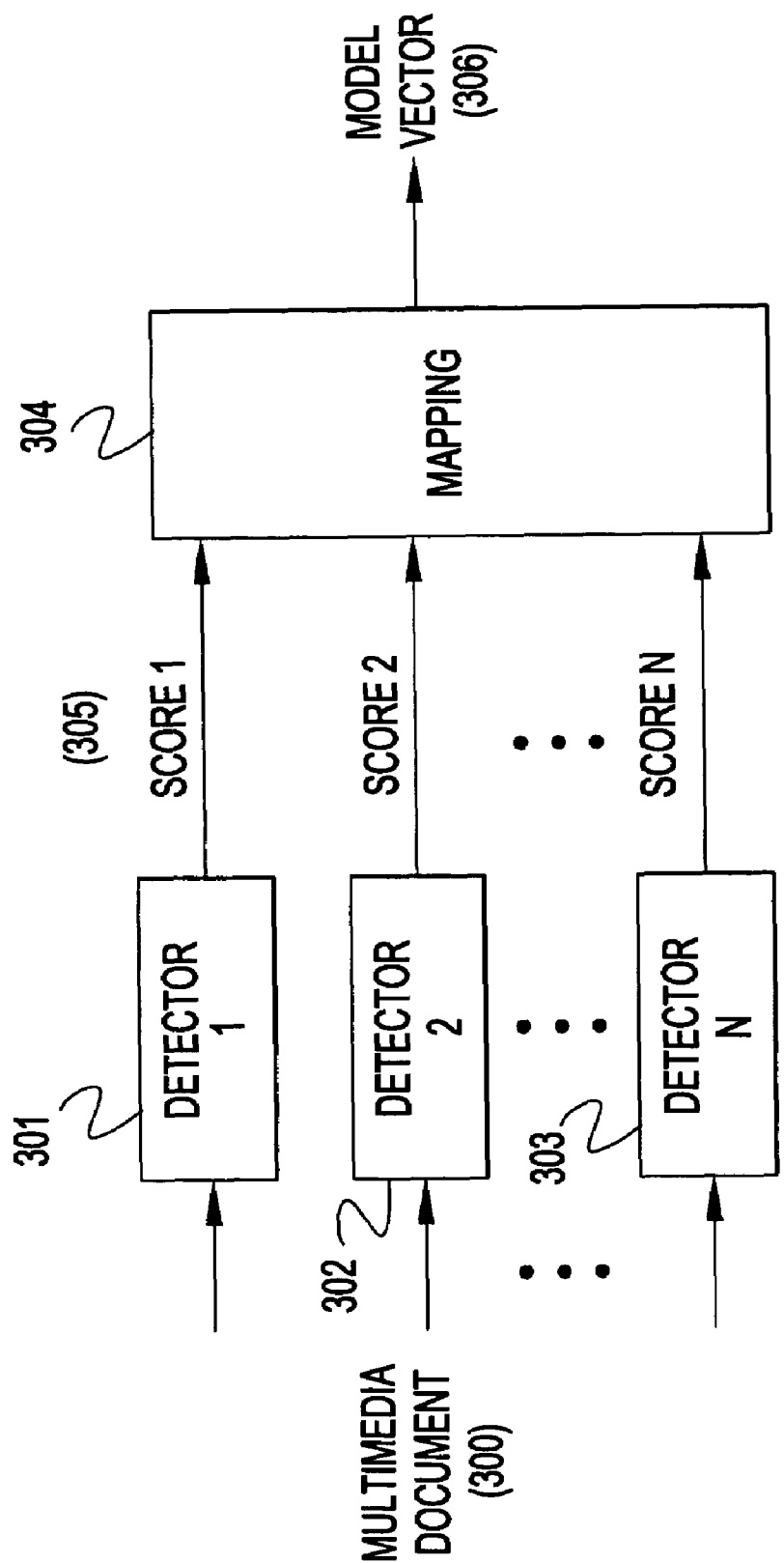

FIG.4

Cityscape (0.35)
Face (0.87)
Indoors (0.17)
Landscape (0.7) → [0.35, 0.87, 0.17, 0.7, 0.17, 0.25, 0.44, 0.2]
Monologue (0.17)
Outdoors (0.25)
People (0.44)
Text_Overlay (0.2)

Detector Scores (400)　　　　　　Model Vector (401)

Animal (0.88)
Beach (0.98)
Boat (0.51)
Bridge (1)
Building (0.25)
Car (0.31)
Cartoon (0.71)
Cloud (0.22) → [0.88, 0.98, 0.51, 1, 0.25, 0.31, 0.71, 0.22
Desert (0.22)　　0.22, 0.26, 0.24, 0.73, 0.89, 0.59, 1, 0.66,
Factory-Setting (0.26)　0.67, 0.55, 0.87, 0.072, 0.14, 0.25, 0.57, 1.1,
Flag (0.24)　　0.43, 0.47, 0.19, 0.77, 015]
Flower (0.73)
Graphics (0.89)
Greenery (0.59)
Horse (1)
House_Setting (0.66)
Land (0.67)
Man_Made_Scene (.055)
Mountain (0.87)
Office_Setting (0.072)
Road (0.14)
Sky (0.25)
Smoke (0.57)
Sport_Event (1.1)
Tractor (0.43)
Train (0.47)
Transportation (0.19)
Tree (0.77)
Water_Body (0.15)

Detector Scores (402)　　　　　　Model Vector (403)

METHOD AND APPARATUS FOR CONTENT REPRESENTATION AND RETRIEVAL IN CONCEPT MODEL SPACE

FIELD OF THE INVENTION

The present invention relates to the use of model vectors for indexing multimedia documents and more specifically to a method and apparatus for generating model vector representations, for associating model vectors with multimedia documents to provide an index, and using model vectors for searching, classifying, and clustering multimedia documents. The present invention relates also to the use of model vectors for purposes of information discovery, personalizing multimedia content, and querying a multimedia information repository.

BACKGROUND OF THE INVENTION

The growing amount of digital information in the form of video, images, textual and other multimedia documents is driving the need for more effective methods for indexing, searching, categorizing, and organizing the information. Recent advances in content analysis, feature extraction, and classification are improving capabilities for effectively searching and filtering multimedia documents. However, a significant gap remains between the low-level feature descriptions that can be automatically extracted from multimedia content, such as colors, textures, shapes, motions, etc., and the semantic descriptions, such as objects, events, scenes, and people, that are meaningful to users of multimedia systems.

The problem of multimedia indexing can be addressed by a number of approaches that require manual, semiautomatic, or fully automatic processing. One approach uses annotation or cataloging tools that allow humans to manually ascribe labels, categories, or descriptions to multimedia documents. For example, authors M. Naphade, C.-Y. Lin, J. R. Smith, B. Tseng, and S. Basu, in a paper entitled "Learning to Annotate Video Databases," *IS&T/SPIE Symposium on Electronic Imaging: Science and Technology—Storage & Retrieval for Image and Video Databases X*, San Jose, Calif., January, 2002, describe a video annotation tool that allows labels to be assigned to shots in video. The authors also teach a semiautomatic method for assigning labels based on active learning. Fully-automatic approaches are also possible. For example, authors M. Naphade, S. Basu, and J. R. Smith teach, in "A Statistical Modeling Approach to Content-based Video Retrieval," *IEEE International Conference on Acoustics, Speech and Signal Processing (ICASSP-2002)*, May, 2002, methods for automatically assigning labels to video content based on statistical modeling of low-level visual features. The automatic labeling technique is useful for allowing searching of video based on the automatically assigned labels, however, the indexing is limited to matching values of a small vocabulary, such that if the user enters a search term that does not match one of the label terms, then the search does not find any target multimedia documents.

Given that automatic systems are improving capabilities for assigning labels, categories, and descriptions to multimedia documents, new techniques are needed that leverage these descriptions to provide more meaningful ways for indexing, searching, classifying and clustering these documents using the descriptions. Furthermore, the systems should take into account the uncertainty or reliability of the automatic systems as well as the relevance of any labels, categories, or descriptions assigned to multimedia documents in order to provide an effective index.

It is, therefore, an objective of the present invention to provide a method and apparatus for indexing multimedia documents using a model vector representation that captures the results of any automatic labeling and its corresponding scores, such as confidence, reliability, and relevance.

It is another objective of the invention to use the model vector representation in applications of information discovery, personalizing multimedia content, and querying of a multimedia information repository.

SUMMARY OF THE INVENTION

The aforementioned and other objectives are realized by the present invention which provides an apparatus and method for indexing multimedia documents using model vector representation that encapsulates the results of classification or labeling of multimedia documents and any corresponding uncertainty, reliability, or relevance scores into a multidimensional vector that can be used for searching, classification, and clustering of the multimedia documents. The model vector representation involves a mapping of lexical entities to dimensions in a multidimensional vector space, which allows the documents to be represented and indexed in that multidimensional space.

The advantage of the model vector representation is that it captures the labeling broadly across the entire lexicon. It also provides a compact representation that captures the uncertainty of the labels or classification results. The model vector representation has also advantages for indexing in that its real-valued multidimensional nature allows for efficient indexing in a metric space, allowing straightforward computation of distances or similarities of model vector representations. This allows effective methods for using model vectors for similarity searching of multimedia documents, relevance feedback-based searching, classification, clustering, filtering, and so on.

BRIEF DESCRIPTION OF THE DRAWINGS

The invention will hereinafter be described in greater detail with specific reference to the appended drawings wherein:

FIG. 3 shows the detection, scoring, and mapping processes for generating a model vector for a multimedia document;

FIG. 4 shows examples of model vectors generated based on detector scoring;

DETAILED DESCRIPTION OF THE INVENTION

Figure 1:
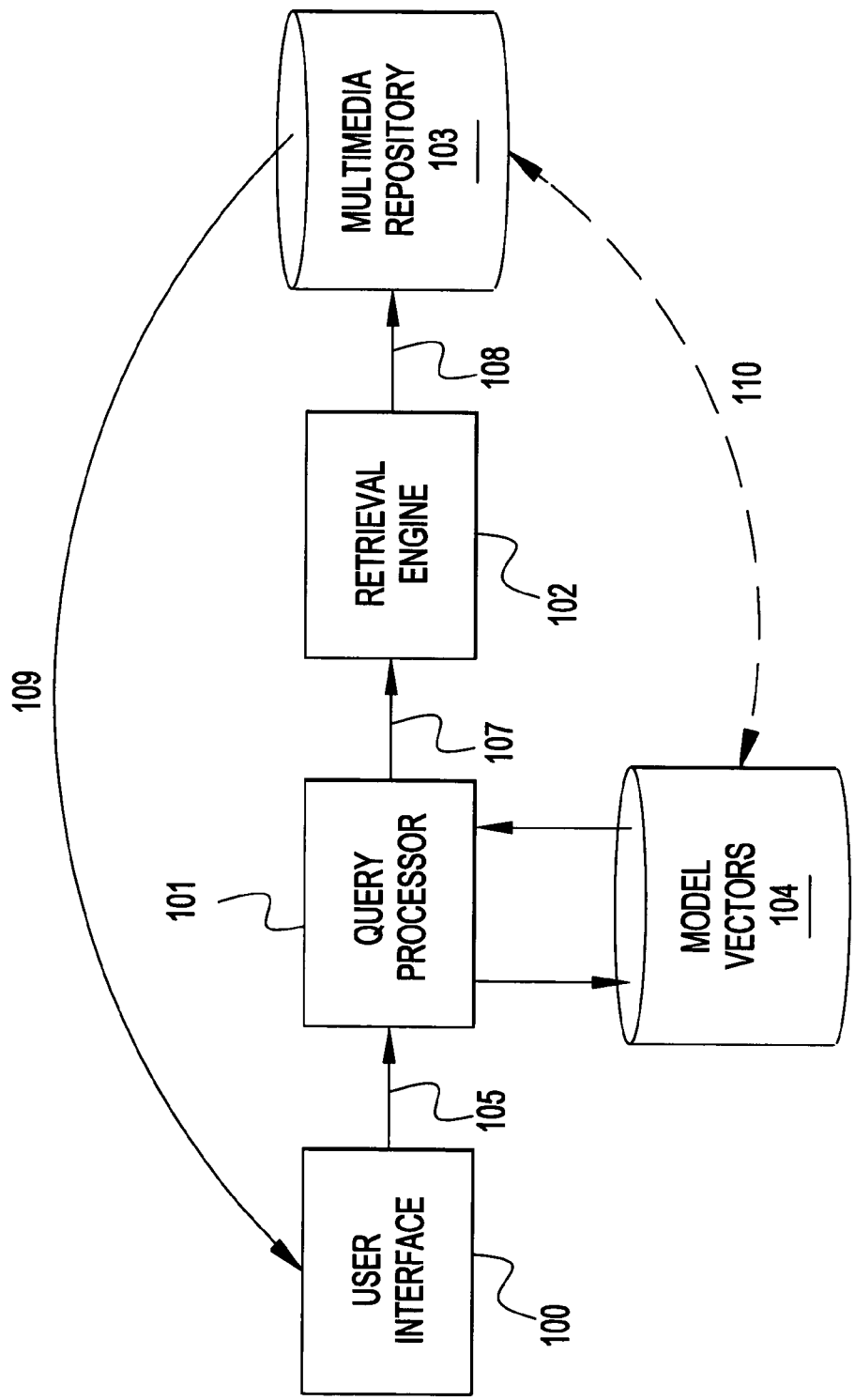
FIG. 1 shows a multimedia information retrieval system in which the query processor uses a model vector index for searching.

FIG. 1 depicts one example of a multimedia information retrieval system having features of the present invention. As depicted, a user, through a user interface (100), issues a query in step (105) to a multimedia information retrieval system. The query is handled by a query processor (101). The query processor searches in step (106) the set of stored index values (104) to find matches to the user's query. In the case of index values in the form of model vectors, the values correspond to multidimensional vectors that relate to semantic dimensions of each indexed multimedia document. The matches are passed to a retrieval engine in step (107) and matching multimedia documents are retrieved in step (108) from the multimedia repository (103). The corresponding multimedia documents are determined on the basis of the association (110) of the model vectors with specific multimedia documents in the repository. The multimedia documents are then returned to the user in step (109) and displayed at the user interface (100). The model vector representation provides one way for representing a set of stored index values (104) that can be used to find matches for the user query.

The model vector representation encapsulates the results of applying a series of detectors or classifiers to the multimedia documents. For example, consider a set of classifiers that assign lexical entities from the following lexicon: {"car", "boat", "train"} by detecting whether these concepts are depicted in a multimedia document. The detection problem can be viewed as a set of binary classifiers that detect the presence or absence of each concept by assigning a score that reflects the certainty with which each concept is present. For example, the system can give a score of 0.75 for "car", which can be interpreted as meaning that the confidence with which a "car" label is assigned is 75%, On the other hand, the system can give a score of 0.25 for "train", which can be interpreted as meaning that the confidence with which a "train" label is assigned is 25%. Overall, the system results in scores for these multiple detectors, and the model vector captures these scores in a single representation, which can then be used as an index for the multimedia documents.

Figure 2:
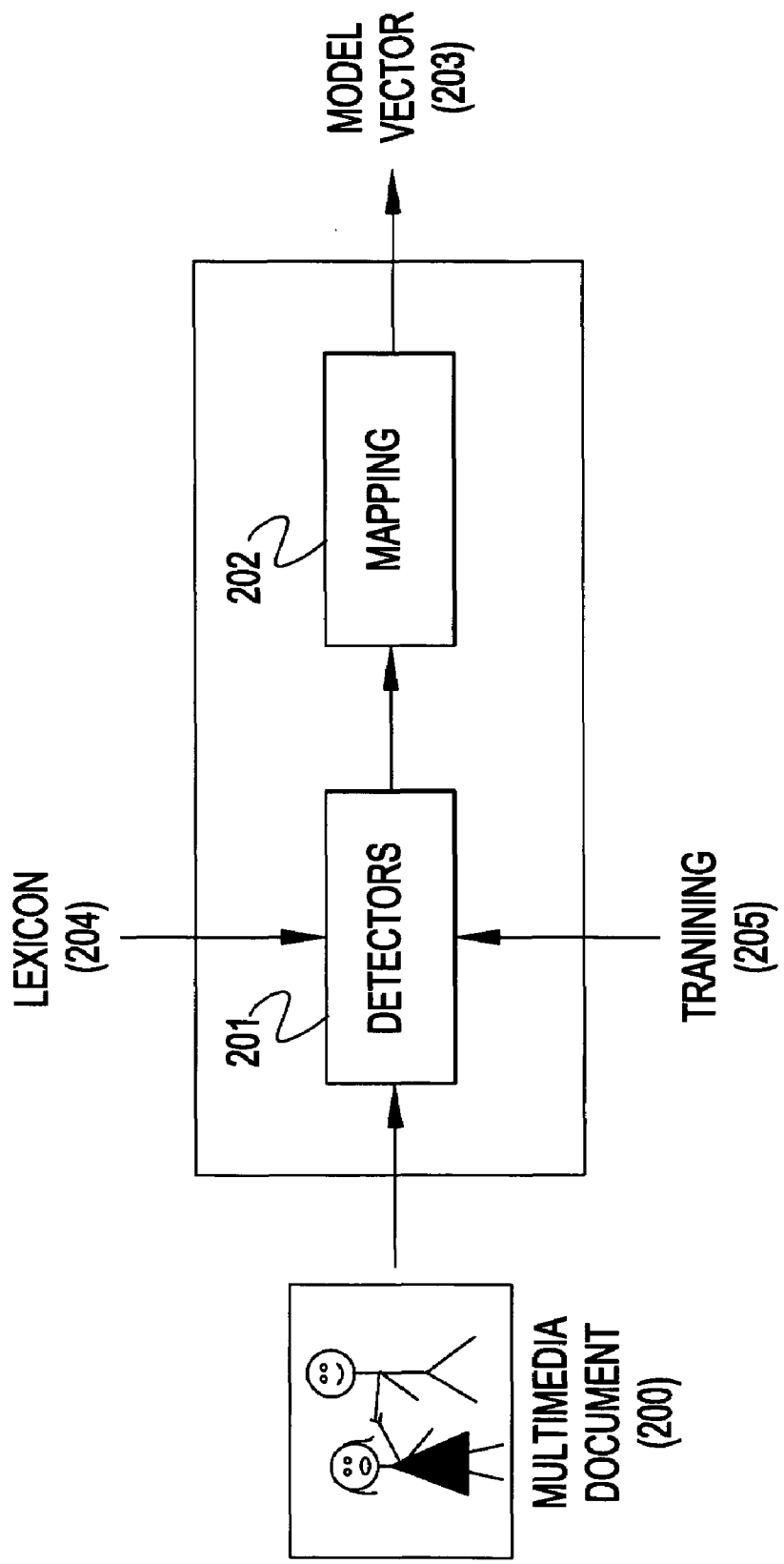
FIG. 2 shows the generation of a model vector for a multimedia document given a lexicon and set of trained detectors.

FIG. 2 depicts the process of generating a model vector for a multimedia document or a query. The multimedia document (200) is first operated on with a plurality of detectors (201) and scored in relation with the concepts underlying each of the detectors. The detectors themselves may correspond to a fixed lexicon (204) or fixed set of categories, objects, events, scenes, or people. For example, the Library of Congress Thesaurus of Graphical Material (TGM) provides a set of categories for cataloging photographs and other types of graphical documents. The detectors may be built and used such that each detector corresponds to one of the TGM categories. The concepts of the lexicon (204) may also be generic, specific, or abstract. For example, a concept may correspond to a generic entity, such as "scenes showing bridges." Alternatively, a concept may correspond to a specific entity, such as "scenes showing the Golden Gate Bridge." Finally, a concept may correspond to an abstract entity, such as "modern civilization." The detectors (201) may correspond to trained models or other types of statistical classifiers. In the case of training (205), examples of labeled multimedia documents can be used in a learning process to define the detector (201) models and their parameters. The output of the detectors (202) is then transformed in a mapping process (202) to produce a model vector (203). The model vector provides a form of aggregate scoring of the multimedia document (200) in relation to the concepts of the lexicon (204). Furthermore, the model vector (203) allows reasoning about the multimedia document (200) by considering its scoring with respect to the lexicon.

FIG. 3 depicts one implementation of generating model vectors for multimedia documents in which the multimedia documents are analyzed and scored using a set of detectors. Each multimedia document (300) is classified by applying N detectors (301–303). The detectors may take any number of forms including Support Vector Machines, Gaussian Mixture Models, Hidden Markov Models, Neural Nets, Bayes Nets, Linear Discriminant Analysis, and so on. Each detector may represent a particular semantic concept. For example, considering the lexicon: {"car", "boat", "train"}, the detectors may represent the concepts as follows: detector 1="car", detector 2="boat", and detector 3="train". That is, detector 1 determines whether the "car" concept is relevant to the multimedia document, and the other detectors operate similarly. The detectors may have been previously trained to detect their respective concepts by using techniques the learn, or build the models, based on supplied ground-truth labeled examples.

The detectors (301–303) may use a variety of information related to the multimedia document (300) for performing each detection. For example, the detectors (301–303) may use one or more modalities of information (visual, audio, speech, text) that comprise the multimedia document (300). The detectors (301–303) may also use content-based descriptors of features such as colors, textures, shapes, motions, sound frequencies, spatial or temporal layouts, that are extracted from the different modalities of information from the multimedia document (300). Example descriptors include color histograms, edge histograms, motion vectors, shape boundary descriptors, and so on. The detectors (301–303) may also use metadata related to the multimedia document (300). For example, information such as the title, author, creation date, genre, and so on may be used. In addition, other contextual information may be used, such as the relation of the multimedia document (300) to other documents. The detectors (301–303) may also use knowledge bases or semantic nets that allow inferencing and reasoning based on the organization of information and knowledge related to a lexicon or multimedia information repository.

For each detector, a score (305) is produced for each multimedia document. The score provides information on the modeling of its respective concept by the detector in relation to the multimedia document (300). The score may reflect many things, such as the confidence or uncertainty (collectively referred to as "confidence") by which the detector detects the concept in the document, the relevance of the concept to the document, or the reliability of the detector in detecting the concept. For example, considering detector 1 as above, the score may indicate the confidence with which the detector is able to detect the depiction of a "car" in the multimedia document. The confidence may relate to the proximity to a decision boundary or threshold. For example, if the multimedia document is far from the decision boundary for detecting "car", then high confidence may be concluded. However, if the multimedia document is close to the decision boundary, then low confidence may be concluded. A relevance score may indicate how relevant the concept is to the multimedia document. For example, if a "car" is only partly depicted or does not comprise a significant part of the multimedia document, then a low relevance score may be determined. Alternatively, a reliability score may indicate how reliable the detector is for detecting its respective concept. For example, if detector 1 was trained using only a few examples of "cars", then a low reliability score may be determined. However, if it was trained using many examples, then a high reliability score may be determined. The scores may themselves reflect only one of these attributes, such as to produce a one-dimensional value.

However, the scores may also be multidimensional by providing information on multiple attributes.

Once the scores are produced for each of the detectors, they are mapped (304) to produce the model vectors (306). In some cases, a single model vector (306) is produced for each multimedia document (300), such as in the case when each detector (301–303) uses multiple modalities (e.g., image, video, audio, text, speech) for making their classification. Alternatively, multiple model vectors (306) may be produced for each multimedia document, such as in the case when each detector uses only one modality. In this case multiple model vectors may be generated for each multimedia document, to reflect multiple scores, for example one relative to audio modality, another relative to image modality, and so forth.

The mapping (304) to produce the model vector or vectors provides a combination or aggregation of scores produced from the detectors. In some cases, the mapping provides a simple operation of concatenating the N scores to produce an N-dimensional vector. For example, considering the three element lexicon {"car", "boat", "train"}, as above, in which a one-dimensional confidence score is produced by each detector, (that is, classifier 1 produces score C1, classifier 2 produces score C2, and classifier 3 produces score C3), then the concatenation operation produces a three-dimensional model vector M=[C1, C2, C3]. Alternatively, the mapping (304) can produce a linear weighting or transformation of the confidence scores.

The confidence scores can be weighted by the reliability of the detectors or relevance of the classification results. Consider the reliability scores R1, R2, R3 for each of the three detectors, respectively. With weighting, the mapping (304) may produce the three-dimensional model vector M=[R1*C1, R2*C2, R3*C3] by multiplying the reliability scores Ri with the confidence scores Ci. Alternatively, considering relevance scores L1, L2, L3 for each of the three detectors, respectively, then, the mapping (304) may produce the three-dimensional model vector M=[L1*C1, L2*C2, L3*C3] by multiplying the relevance scores Li with the confidence scores Ci. Other mappings (304) may provide linear transformation and/or dimensionality reduction, such as in the cases of Principal Components Analysis, Singular Value Decomposition, Wavelet Transform, Discrete Cosine Transform, and the like. Alternatively, the mappings (304) may provide nonlinear transformations, such as in the cases of Support Vector Machines, Neural Nets, and the like. The mapping (304) may also involve quantization to a discrete space or binary-valued space. For example, by thresholding the confidence scores (305) from the detectors at the mapping stage (304), a binary model vector can be produced that indicates whether each concept is present or absent in the multimedia document (300).

Overall, the mapping (304) may result in a variety of specific mappings from the individual concepts or detectors (301–303) to the individual dimensions of the model vector (306). In some cases, such as with a mapping (304) that concatenates the scores (305), a one-to-one mapping of concepts to model vector dimensions is produced. However, in other cases, it may be desirable to produce a many-to-one mapping, such as to reduce the dimensionality of the model vector (306) in relation to the original concept space. In other cases, the mapping (304) may be one-to-many or many-to-many, such as to allow some degree of redundancy in the model vector (306).

FIG. 4 shows examples of model vectors generated based on detector scoring. Given a scored set of detector results (400) for a fixed lexicon={"Cityscape", "Face", "Indoors", "Landscape", "Monologue", "Outdoors", "People", "Text_Overlay"}, the model vector (401) is generated by mapping each of the detector scores (400) to a unique dimension of the multidimensional model vector (401). In this example, the score for "Cityscape", which is 0.35, is mapped to the first dimension of the model vector. The score for "Face", which is 0.87, is mapped to the second dimension, and so on. In order to facilitate matching between model vectors corresponding to different multimedia documents, a consistent mapping of the detector scores to the model vector dimensions can be used. Similarly, the example detector scores (402) for a larger lexicon can be mapped to the model vector dimensions (403). In this case the score for "Animal" is mapped to the first dimension of the model vector. The score for "Beach" is mapped to the second dimension, and so on.

Figure 5:
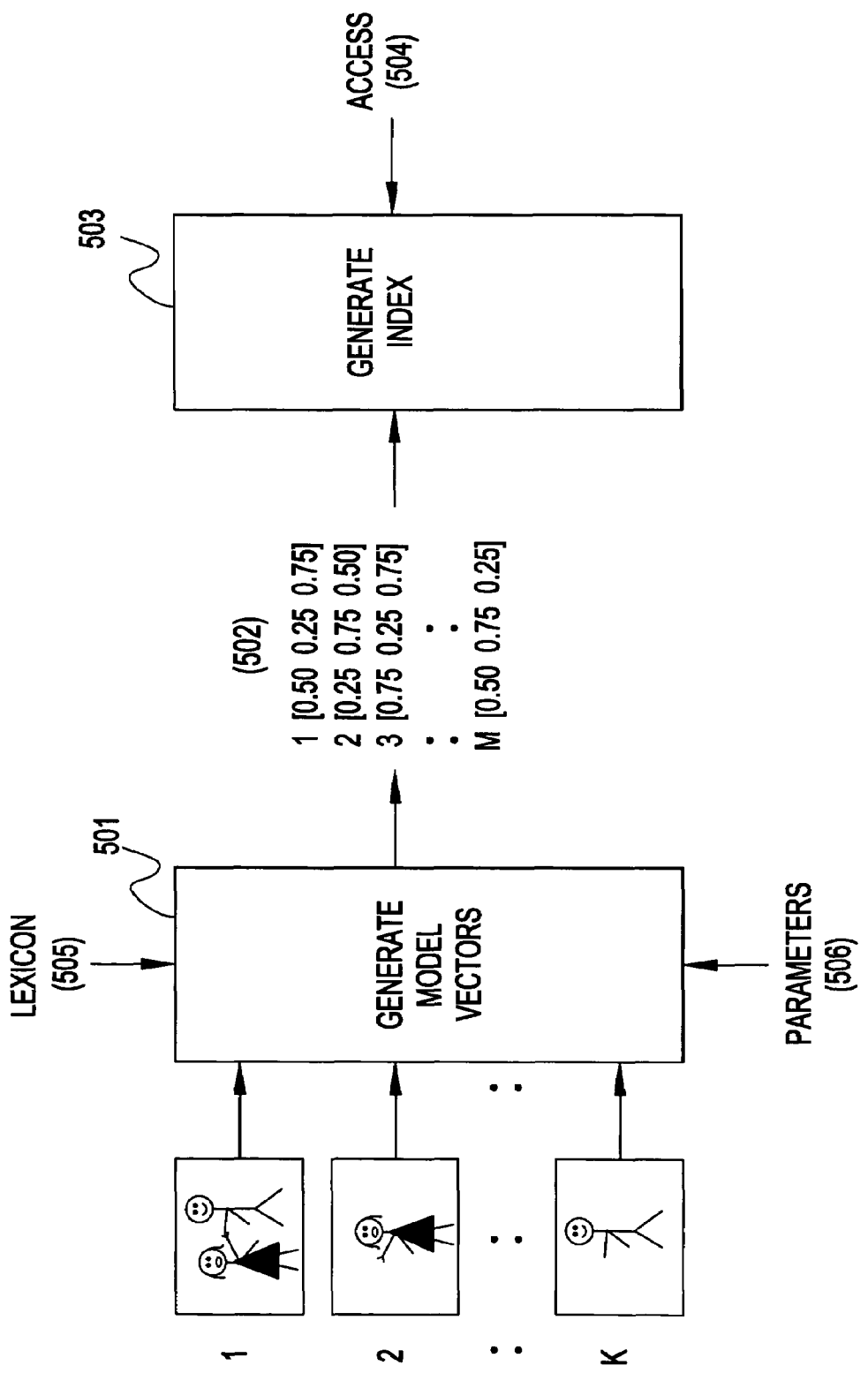
FIG. 5 shows the process of indexing multimedia documents using model vectors.

FIG. 5 shows the process of indexing multimedia documents using model vectors. First, a collection of K multimedia documents (500) is analyzed in the model vector generation process (501) to produce a set of M model vectors (502). The model vector generation process (501) may use a fixed lexicon (505) and corresponding set of detectors across all of the multimedia documents (500) in order to allow consistency in producing the model vectors (502). Furthermore, the model vector generation process (501) may also use a fixed set of parameters for the scoring (305) and mapping (304) across all of the multimedia documents (500) for the same reason. Once the model vectors (502) are produced, they are associated with their corresponding multimedia documents (500). For example, the association may be represented using database key values that state a primary key-foreign key relationship between each model vector (502) and each multimedia document (500). Alternatively, the association may be represented by associating with each model vector (502) a media locator that gives the address of its corresponding multimedia document (500). Alternatively, it is possible to use identifiers that uniquely identify each multimedia document (500) to allow the association of each of the model vectors (502) to be represented. It is also possible to associate the model vectors (502) directly with each multimedia document (500) by representing the value of the model vector in the header or metadata fields of each multimedia document (500), or by persistently associating the values of the model vectors (502) with each multimedia document (500) by watermarking or some other persistent association method.

Once the model vectors (502) are generated and their association with the multimedia documents (500) is represented, an index is built that allows access (504) to the multimedia documents (500) on the basis of the values of the model vectors (502). The index may allow proximity-based access, such as to allow similarity-searching or nearest neighbor searching. In these cases, the access is achieved by supplying a query model vector, and similar model vectors or a fixed sized set of nearest target model vectors are found from the index. The index may also support range-based access in which case a query model vector is supplied, and all target model vectors within a fixed distance from the query model vector are found from the index.

Figure 6:
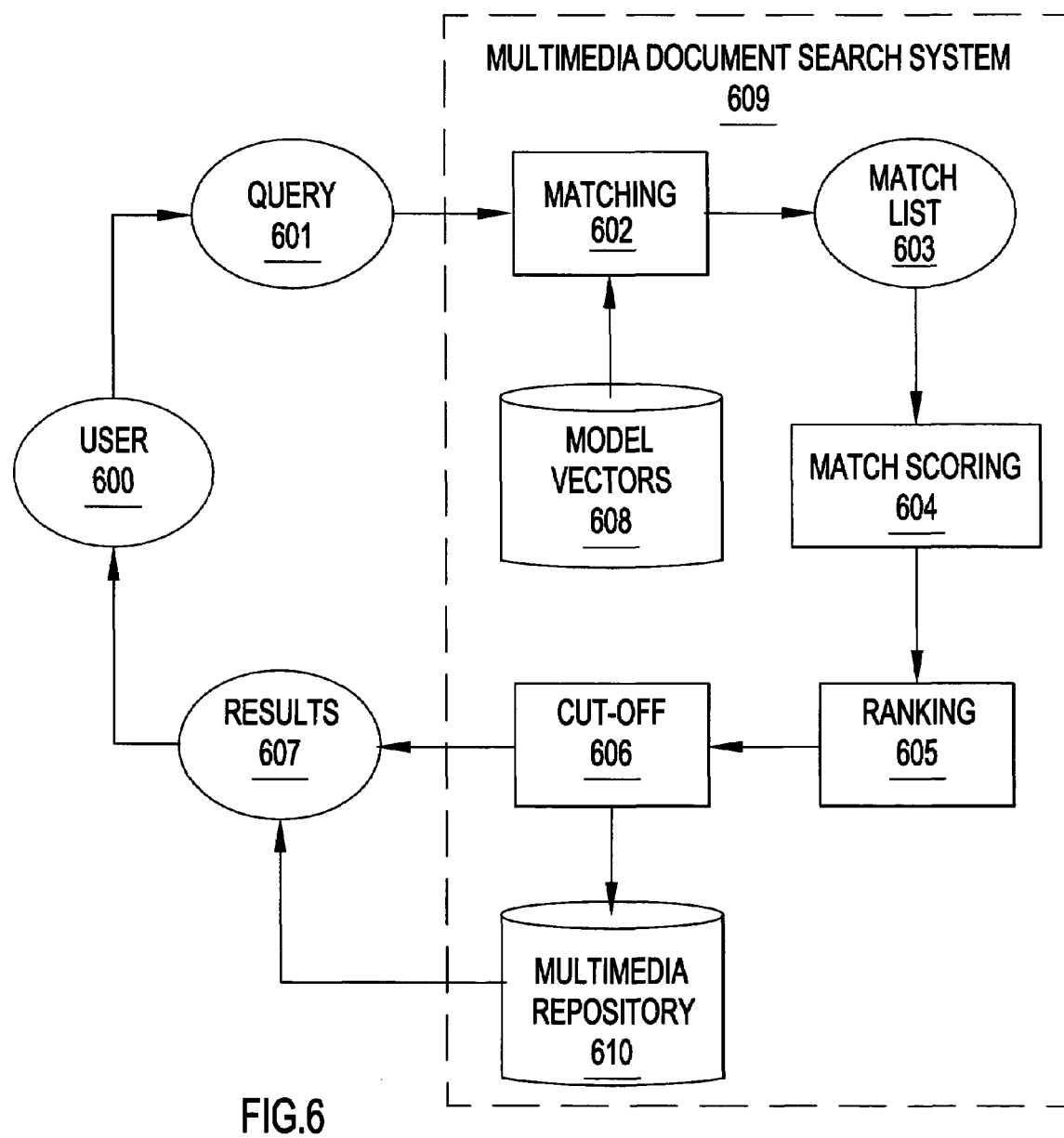
FIG. 6 shows a query process using model vectors.

FIG. 6 shows a query process using model vectors. The values of the model vectors are matched to a user's query in order to retrieve multimedia documents. The user (600) issues a query (601) to the multimedia document search system (609). The query may be in the form of example model vectors provided by the user. The search interface may optionally allow the user to author the query model vectors, for example, by providing an interface that allows the user to identify semantic concepts relevant to the query and to assign scores for constructing model vector representations. Alternatively, the search interface may optionally display multimedia documents to the user and allow the user to select which multimedia documents are relevant for the query. The system would then use precomputed associated model vectors for the query, or would generate the model vectors at query time. Alternatively, the query may be in the form of examples of multimedia documents provided by the user, in which case the query multimedia documents can be analyzed and processed using a model vector generation process to create query model vectors.

Once the query model vectors are available, they are matched in step (602) to the stored model vector values (606). The matching process may involve using an index structure to identify (607). The search system (609) may use this information in conjunction with the query processing to retrieve matches based on the model vector scores.

While the model vectors can be used for retrieval of multimedia documents, they can also be used for clustering and classifying multimedia documents. For example, the model vectors can be analyzed in the multidimensional metric space to identify clusters using a variety of techniques such as agglomerative clustering. The model vectors can also be classified using a variety of supervised learning methods, such as those based on discriminative or generative modeling. Example classifiers include Support Vector Machines and Gaussian Mixture Model. Other techniques such as active learning and boosting can also be applied to the model vector values for classification purposes.

The model vectors can also be used for information discovery and mining of a multimedia repository. For example, the correlation of the dimensions of a collection of model vectors may be examined to reveal information about the co-occurrence of concepts as they appear in multimedia documents.

Figure 7:
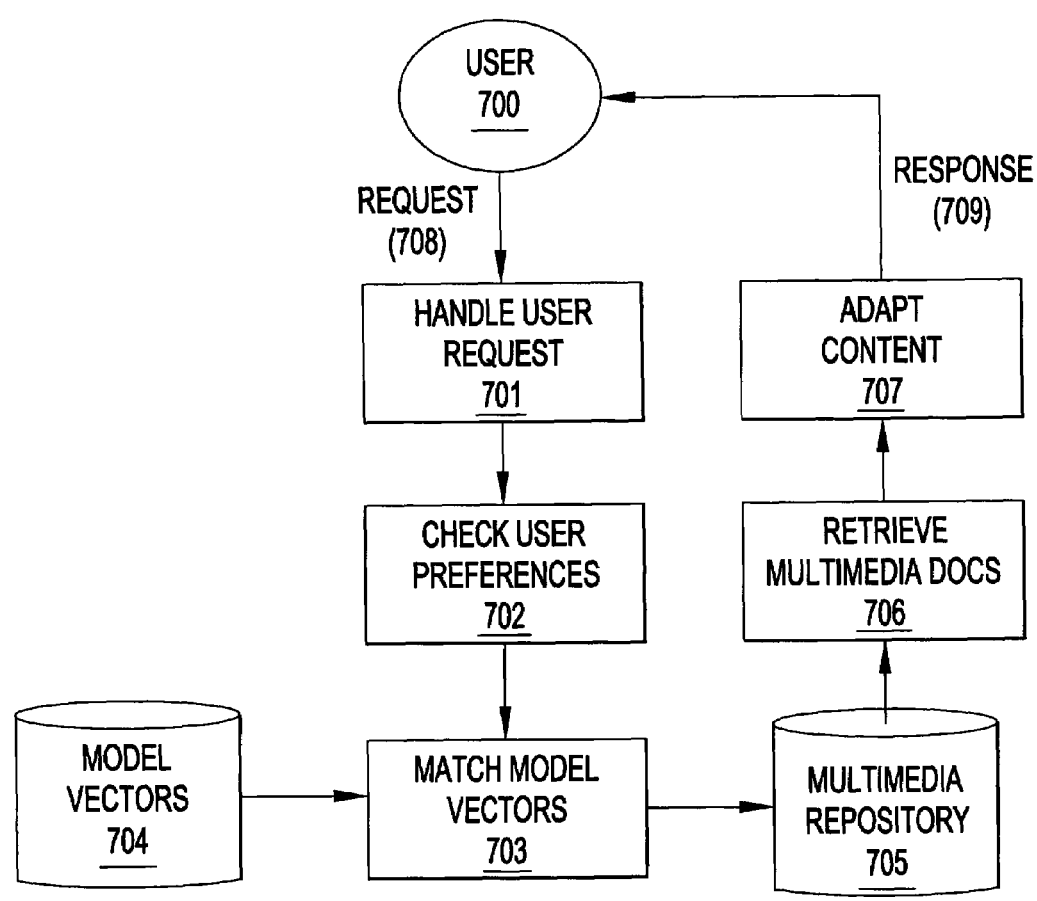
FIG. 7 shows the adaptation of multimedia documents using model vectors.

FIG. 7 shows the adaptation of multimedia documents using model vectors. The model vectors may be used for filtering, summarizing, or personalizing multimedia documents or information from a multimedia repository. A user (700) issues a request (708) to the multimedia information system. The request is handled in step (701). The request may contain a specific user query, such as in (601), in which the user supplies example model vectors or multimedia documents, or identifies semantic concepts. Alternatively, the request may be in the form of a login, in which a profile is already stored for the user along with preference information. In this case, the user preference information may optionally be checked in step (702). The preference information may also be stored in the form of example model vectors, multimedia documents, or identified semantic concepts. The user query and user preference information may then be aggregated and processed to generate the query model vectors, which are then used to match and retrieve the stored model vectors (704), which are in turn used as indexes for selectively retrieving multimedia documents in step (706) from the multimedia repository (705). This provides a filtering of the multimedia documents on the basis of the model vector values.

Optionally, the model vectors associated with the multimedia documents may be used in combination with the query model vectors to adapt the content of the multimedia documents in step (707). The adaptation may personalize the multimedia content according to the user preferences for a specific query. For example, the user preferences may indicate that the "sports" concept is important. In this case, the retrieved multimedia document, e.g., a "news" video, can be processed to extract only the "sports" segment. Alternatively, the adaptation may summarize the content, such as by compressing the "non-sports" segments and extracting the highlights from the "sports" segments.

The invention has been described with reference to preferred embodiments. It will be apparent that one having skill in the art could make modifications without departing from the spirit and scope of the invention as set forth in the appended claims.

The invention claimed is:

1. A computer-implemented method for generating at least one model vector for representing a multimedia document to facilitate searching for and classifying said document and for clustering said document with other multimedia documents comprising the steps of:
    applying a plurality of concept detectors to the multimedia document, each concept detector corresponding to at least one concept from a fixed set of lexical entities, categories, objects, features, events, scenes, and people;
    scoring said multimedia document with respect to each concept detector whereby each concept detector produces a score; and
    mapping said scores to a multidimensional space by aggregating said scores produced by said detectors to produce at least one vector representation.

2. The method of claim 1 wherein said plurality of concept detectors corresponds to a fixed lexicon of categories, objects, events, scenes, and people.

3. The method of claim 1 wherein said document comprises multiple modalities such as audio, visual, text and speech and wherein said concept detectors operate on single or multiple modalities present in said multimedia document.

4. The method of claim 1 wherein said concept detectors operate on content-based descriptors of document features extracted from said multimedia document.

5. The method of claim 1 wherein said concept detectors operate on metadata associated with said multimedia document.

6. The method of claim 1 wherein said concept detectors operate on contextual information associated with the multimedia document.

7. The method of claim 1 wherein said concept detectors operate on knowledge bases.

8. The method of claim 1 wherein said detectors correspond to trained model statistical classifiers.

9. The method of claim 1 wherein said scoring is based on at least one of the confidence of detecting a concept in the multimedia document, the relevance of a concept to the multimedia document, and the reliability of the detector with respect to the concept.

10. The method of claim 1 wherein said mapping corresponds to at least one of concatenating said scores, performing linear transforms, performing nonlinear transformations, performing quantization, and dimensionality reduction by thresholding.

11. The method of claim 10 wherein said mapping of said scores to model vector dimensions comprises of of one-to-one, one-to-many, many-to-one, and many-to-many.

12. The method of claim 1 wherein said plurality of detectors is fixed for said indexing of multimedia documents.

13. The method of claim 1 wherein said scoring and mapping methods are fixed for said indexing of multimedia documents.

14. A computer-implemented method for indexing multimedia documents to facilitate searching for, classifying, and clustering said documents using model vectors comprising the steps of:

generating one or more model vectors for each multimedia document based on input from a plurality of concept detectors, each concept detector corresponding to at least one concept from a fixed set of lexical entities, categories, objects, features, events, scenes, and people, wherein said generating at least one model vector for representing a multimedia document comprises the steps of:

applying the plurality of concept detectors to the multimedia document;

scoring said multimedia document with respect to each concept detector whereby each concept detector produces a score; and mapping said scores to a multidimensional space by aggregating said scores produced by said detectors to produce one or more model vectors;

associating said model vectors with corresponding multimedia documents; and building an index for accessing said multimedia documents based on values of said associated model vectors.

15. The method of claim 14 wherein said plurality of detectors is fixed for said indexing of multimedia documents.

16. The method of claim 14 wherein said scoring and mapping methods are fixed for said indexing of multimedia documents.

17. The method of claim 14 wherein multiple model vectors are generated for each multimedia document based on each of multiple modalities, features, descriptors, or models.

18. The method of claim 14 wherein said associating is based on database key values, media locators, or other types of identifiers.

19. The method of claim 14 wherein said index allows similarity searching, nearest neighbor access, or range searching based on said model vector values.

20. A computer-implemented method for using model vectors in applications with multimedia documents comprising the steps of:

generating at least one model vector for representing each multimedia document by the steps of:

applying a plurality of concept detectors to the multimedia document, each concept detector corresponding to at least one concept from a fixed set of lexical entities, categories, objects, features, events, scenes, and people;

scoring said multimedia document with respect to each concept detector whereby each concept detector produces a score; and mapping said scores to a multidimensional space by aggregating said scores produced by said detectors to produce at least one vector representation; and performing at least one operation for handling said multimedia documents on the basis of the values of said at least one vector representation.

21. The method of claim 20 wherein said at least one operation comprises using said model vectors for search and retrieval of documents from a multimedia information repository.

22. The method of claim 20 wherein said at least one operation comprises at least one of filtering, summarizing and personalizing multimedia information.

23. The method of claim 20 wherein said at least one operation comprises data mining.

24. The method of claim 20 wherein said at least one operation comprises clustering said documents.

25. The method of claim 20 wherein said at least one operation comprises classifying said documents.

26. A program storage device readable by machine tangibly embodying a program of instructions executable by the machine for performing a method for generating at least one model vector for representing a multimedia document, said method comprising the steps of: to facilitate searching for and classifying said document and for clustering said document with other multimedia documents applying a plurality of concept detectors to the multimedia document, each concept detector corresponding to at least one concept from a fixed set of lexical entities, categories, objects, features, events, scenes, and people;

scoring said multimedia document with respect to each concept detector whereby each concept detector produces a score; and mapping said scores to a multidimensional space by aggregating said scores produced by said detectors to produce at least one vector representation.

27. A program storage device readable by machine tangibly embodying a program of instructions executable by the machine for performing a method for using model vectors in applications with multimedia documents to facilitate searching for and classifying said document and for clustering said document with other multimedia documents wherein said method comprises the steps of:

generating at least one model vector for representing each multimedia document by the steps of:

applying a plurality of concept detectors to the multimedia document, each concept detector corresponding to at least one concept from a fixed set of lexical entities, categories, objects, features, events, scenes, and people;

scoring said multimedia document with respect to each concept detector whereby each concept detector produces a score; and mapping said scores to a multidimensional space by aggregating said scores produced by said detectors to produce at least one vector representation; and performing at least one operation on said multimedia documents on the basis of the values of said at least one vector representation.

28. A computer-based system for using model vectors in applications for handling multimedia documents comprising:

at least one model vector generation component for generating at least one model vector for representing each multimedia document based on input from a plurality of concept detectors, each concept detector corresponding to at least one concept from a fixed set of lexical entities, categories, objects, features, events, scenes, and people, wherein said at least one model vector generation component comprises:

at least one concept detector application component for applying said plurality of concept detectors to the multimedia document;

a scoring component for scoring said multimedia document with respect to each concept detector whereby each concept detector produces a score; and a mapping component for mapping said scores to a multidimensional space by aggregating scores produced by said concept detectors to produce at least one vector representation; and
at least one document processing component for performing at least one operation on said multimedia documents on the basis of the values of said at least one vector representation to facilitate searching for and classifying said document and for clustering said document with other multimedia documents.

* * * * *